(No Model.) 2 Sheets—Sheet 1.

F. L. WHITE.
COMBINED COTTON PLANTER AND FERTILIZER DISTRIBUTER.

No. 304,151. Patented Aug. 26, 1884.

WITNESSES:
Chas. Nida.
C. Sedgwick

INVENTOR:
F. L. White
BY Munn & Co.
ATTORNEYS.

(No Model.) 2 Sheets—Sheet 2.
F. L. WHITE.
COMBINED COTTON PLANTER AND FERTILIZER DISTRIBUTER.
No. 304,151. Patented Aug. 26, 1884.
Fig. 3.
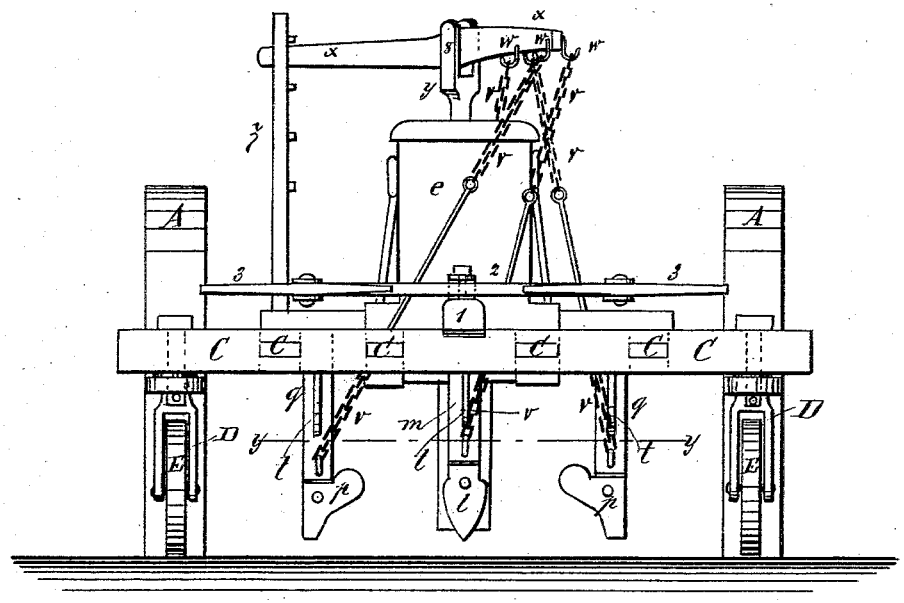
Fig. 4.
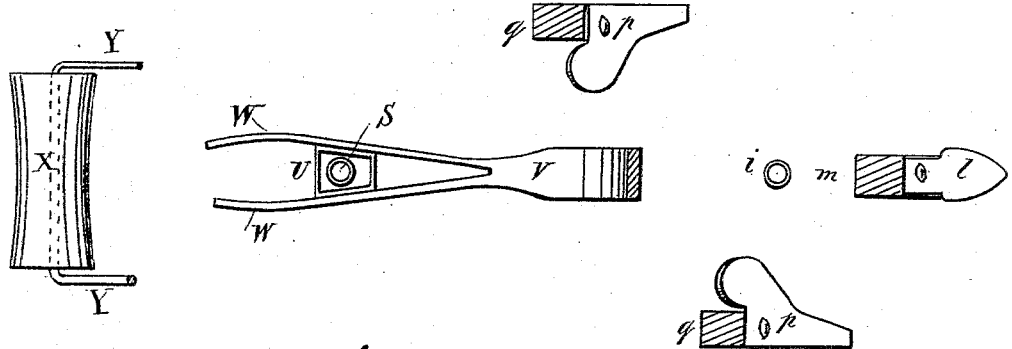
Fig. 5. Fig. 6.
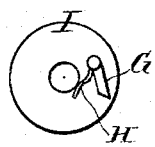 
WITNESSES:
Chas. Nida
C. Sedgwick
INVENTOR:
F. L. White
BY Munn & Co
ATTORNEYS.

United States Patent Office.

FRANK LEWIS WHITE, OF LEBANON, TENNESSEE.

COMBINED COTTON-PLANTER AND FERTILIZER-DISTRIBUTER.

SPECIFICATION forming part of Letters Patent No. 304,151, dated August 26, 1884.

Application filed September 17, 1883. (No model.)

*To all whom it may concern:*

Be it known that I, FRANK LEWIS WHITE, of Lebanon, in the county of Wilson and State of Tennessee, have invented certain new and useful Improvements in Combined Cotton-Planters and Fertilizer-Distributers, of which the following is a full, clear, and exact description.

Reference is to be had to the accompanying drawings, forming a part of this specification, in which similar letters of reference indicate corresponding parts in all the figures.

Figure 1:
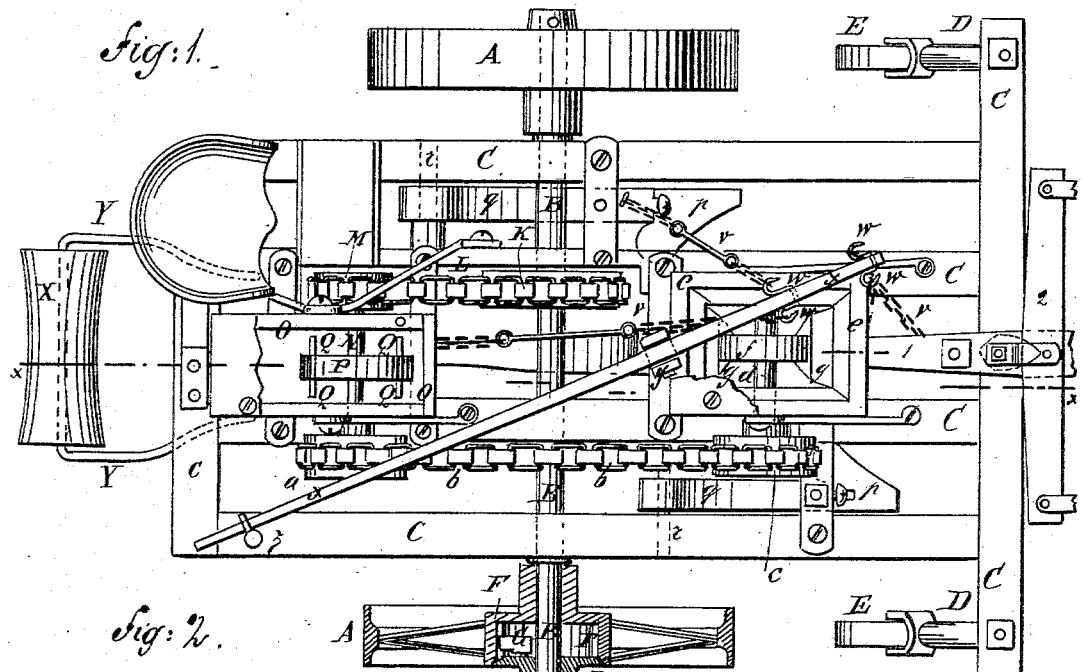
Figure 2:
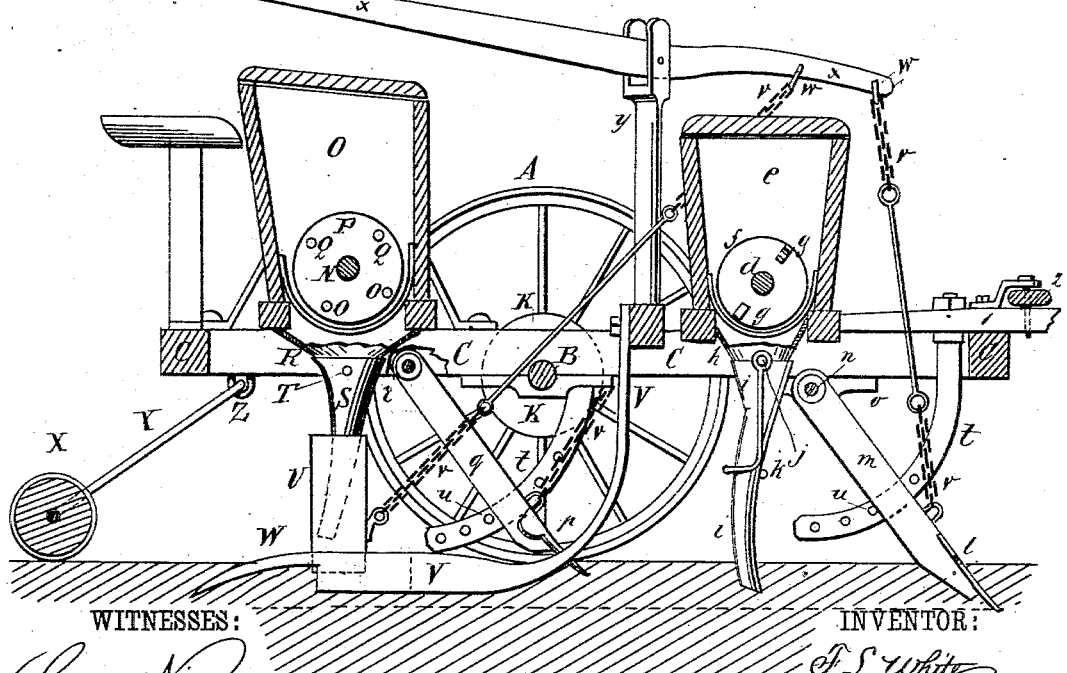

Figure 1, Sheet 1, is a plan view of my improvement, partly in section and parts of the hopper-covers being broken away. Fig. 2, Sheet 1, is a sectional side elevation of the same, taken through the broken line $x$ $x$, Fig. 1. Fig. 3, Sheet 2, is a front elevation of the same. Fig. 4, Sheet 2, is a sectional plan view of a part of the same, taken through the line $y$ $y$, Fig. 3, and showing the relative position of the openers, conducting-spouts, bedding-plows, and covering-roller. Fig. 5, Sheet 2, represents the inner side of one of the pawl-carrying disks. Fig. 6, Sheet 2, represents the ratchet-recess in the outer end of a wheel-hub.

The special object of this invention is to facilitate the planting of cotton-seed and the distribution of fine fertilizers, and to promote uniformity in such operations.

The invention consists in a combined fertilizer-distributer and cotton-planter constructed with wheels and axle and a frame carrying two hoppers—one in front of the other—provided with discharge-wheels connected with each other and the axle by chains and chain-wheels, the said frame being also provided with a furrow-opening plow and covering-plows for bedding the soil with the fertilizer, and with a furrow-opening spring-runner provided with covering-teeth, and a roller for planting the seed, as will be hereinafter fully described, and specifically set forth in the claims.

A represents the drive-wheels, the axle B of which revolves in bearings attached to the side bars of the frame C, a little in the rear of the centers of the said side bars. The ends of the front cross-bar of the frame C project, and to them are pivoted the standards D of caster-wheels E, to support the forward end of the machine. The hubs of the drive-wheels A are recessed, and in the inner surface of the rim or shell thus formed are ratchet-teeth F, with which engage pawls G, held out against the said ratchet-teeth by springs H, attached to the said pawls and resting against the side of the axle B. The pawls G are pivoted to disks I, placed upon the axle B, and kept in place and from turning by linchpins J, passing through the hubs of the said disks and through the said axle. The disks I are made of such a size as to close the recesses in the outer ends of the hubs of the wheels A.

To the axle B is attached a chain-wheel, K, around which passes an endless chain, L. The endless chain L also passes around a smaller chain-wheel, M, attached to the end of a short shaft, N, which revolves in bearings in the sides of the hopper O. The hopper O is secured to the rear middle part of the frame C, and to the shaft N, within the said hopper, is attached a small wheel, P, from the opposite side of which project pins Q, to agitate the cotton-seeds and cause them to pass out regularly through the opening in the bottom of the hopper.

To the bottom of the hopper O is attached a funnel-shaped or tapered spout, R, to guide the seeds into the conductor-spout S, which is made of leather or other flexible material, and is suspended from the funnel-spout R by pins T, attached to the said spout R, and which pass through slits or other apertures in the upper part of the said spout S. The lower end of the flexible conducting-spout S is inserted in the upper end of the tube U, which is made larger than the said spouts S, and is attached at its lower end to the forked rear end of the furrow-opening runner V.

The forward part of the runner V is curved upward, is attached at its end to a cross-bar of the frame C, and is made elastic, so that the said runner will be held down to its work by its own elasticity.

To the rear ends of the branches of the runner V are attached teeth W, to fill the furrow opened by the said runner and cover the seed. The soil is pressed down upon the seed and the covering is completed by the concaved roller X, which revolves upon the straight middle part of the bail Y. The ends of the bail Y have eyes formed in them, and are hinged to the frame C by staples Z, eyebolts, hooks, or other suitable means, so that the said roller can adjust itself to the surface of uneven ground. To the other end of the short shaft N is attached a chain-wheel, $a$, around which passes an endless chain, $b$. The chain $b$ also passes around the chain-wheel $c$, attached to the end of the short shaft $d$, which revolves in bearings in the sides of the hopper $e$. The hopper $e$ is attached to the forward part of the frame C, directly in front of the hopper O, and to the shaft $d$, within the said hopper $e$, is attached a small wheel, $f$, to the rim of which are attached lugs or cross-heads $g$, to push the fertilizer out through the discharge-opening in the bottom of the hopper $e$.

To the bottom of the hopper $e$ is attached a funnel-shaped spout, $h$, to guide the fertilizer into the conducting-spout $i$, through which the said fertilizer passes to the ground. The conducting-spout $i$ is made of leather or other suitable flexible material, and is suspended from the spout $h$ by hooks or pins $j$, attached to the said spout $h$, and which pass through slits or other openings in the sides of the upper end of the said flexible spout $i$. The conducting-spout $i$ is kept in place by the guard-rod $k$, the upper end of which is attached to one of the pins or hooks $j$, and upon its lower end is formed a laterally-projecting eye to receive the said spout, as shown in Fig. 2. The spout $i$ is made of such a length as to conduct the fertilizer into the furrow opened by the plow $l$, so that the said fertilizer will not be scattered by the wind. The plow $l$ is attached to the lower end of the standard $m$, which has laterally-projecting journals $n$ formed upon or attached to the opposite sides of its upper end to work in bearings $o$, attached to the frame C, to hinge the said standard to the said frame. The furrow opened by the plow $l$ is filled or partially filled, and the fertilizer is covered by soil thrown by the turn-plows $p$, attached to the lower ends of the standards $q$, which have journals $r$ attached to or formed upon the opposite sides of their upper ends to work in bearings formed in or attached to the frame C, in such positions that the plows $p$ will fill the said furrow and cover the fertilizer in advance of the runner V.

To the frame C, in front of the standards $m$ $q$ $q$, are attached the upper ends of the curved bars $t$, the lower of which pass through slots in the lower parts of the said standards, and have pins $u$ passed through them for the rear sides of the standards to rest against, so that the said standards will be supported against the draft-strain and at the same time can be raised freely. Several holes are formed in the bars $t$ to receive the pins $u$, so that the inclination of the standards $m$ $q$ $q$ can be regulated at pleasure.

To the lower parts of the standards $m$ $q$ $q$ and the rear part of the opener V are attached the lower ends of the chains $v$, the upper ends of which are hooked upon hooks $w$, attached to the forward part of the lever $x$. The middle parts of the chains $v$ can be formed of rods or long links, if desired. The latter construction is shown in the drawings. The lever $x$ is pivoted to an upright, $y$, attached to the frame C between the hoppers O $e$. The rear end of the lever $x$ extends back into such a position that it can be readily reached and operated by the driver, and moves up and down along an upright bar, $z$, attached to the rear part of the frame C, and provided with pins or teeth, so as to hold the said lever in any position into which it may be adjusted.

To the center of the forward end of the frame C is attached the tongue 1, which is provided with a double-tree, 2, and whiffletrees 3, in the ordinary manner. With this construction, as the machine is drawn forward, a deep furrow is opened by the plow $l$, the fertilizer is dropped into it, and is covered by the plows $p$. The furrow is again opened by the opener V to a less depth than before, leaving the fertilizer covered with a thin stratum of soil, and the cotton-seed is dropped, and is covered by the teeth W and roller X.

If desired, the machine can be made wider, so as to plant two rows at a time. In this case four horses should be used to draw it, and the drive-wheels A should be so arranged as to serve as rollers to press the soil down upon the seed.

By detaching the fertilizer and seed-dropping appliances and the furrow-opening runner and adding another plow-standard and plow the machine can be used as a cultivator.

I do not abandon or dedicate to the public any patentable features set forth herein and not hereinafter claimed, but reserve the right to claim the same, either in a reissue of any patent that may be granted upon this application or in other applications for Letters Patent that I may make.

Having thus described my invention, I claim as new and desire to secure by Letters Patent—

1. A combined fertilizer-distributer and cotton-planter, constructed substantially as herein shown and described, and consisting of the wheels and axle and the frame carrying two hoppers, one in front of the other, provided with discharge-wheels connected with each other and the axle by chains and chain-wheels, the said frame being also provided with a furrow-opening plow and covering-plows for bedding the fertilizer, and with a furrow-opening spring-runner secured to frame C, and provided with covering-teeth integral therewith, and a roller for covering the seed, as set forth.

2. The curved spring furrow-runner V, forked at its rear end, and there provided with inward and downward projecting covering-teeth W, and a guide-tube, U, within said forked portion, substantially as set forth.

3. In a combined fertilizer-distributer and cotton-planter, the combination of the hoppers O e, provided with shafts N d, respectively, each carrying a discharging-wheel, chain-wheels M a on shaft N at opposite sides of the hopper O, and chain-wheel c on the shaft d, with the axle B, its chain-wheel K, and the endless chains L b, the former passing around the chain-wheels M K and the latter around the chain-wheels a c, whereby the seed-discharging wheels are driven from the axle, substantially as set forth.

4. In a combined fertilizer-distributer and cotton-planter, the frame C, carrying the pivoted plow-standards m q q, perforated curved supporting-bars t, and their pins u, in combination with lever x, pivoted to standard y, and provided with hooks at its forward end for engaging the connecting-chains of the said standards m q q, and a catch-bar, z, at the rear end of the frame, for engaging the rear end of the lever, whereby the plow-standards will be supported against draft-strain, and can be raised freely when desired, substantially as set forth.

5. In a combined fertilizer-distributer and cotton-planter, the combination, with the plow-standards m q q and the spring-runner V, of the chains v, connecting the said plow-standards with the forward end of the lever x, pivoted to standard y, and the catch-bar z for engaging the rear end of said lever, substantially as herein shown and described, whereby the said standards and runner can be readily raised and supported, as set forth.

FRANK LEWIS WHITE.

Witnesses:
SAM GOLLADAY,
B. J. TURON.